(No Model.)

J. & F. BRUNWASSER.
FLY TRAP.

No. 419,003. Patented Jan. 7, 1890.

Witnesses:

Inventors.
Joseph Brunwasser
Frank Brunwasser
By James J. Ray
Attorney

UNITED STATES PATENT OFFICE.

JOSEPH BRUNWASSER AND FRANK BRUNWASSER, OF PITTSBURG, PENNSYLVANIA.

FLY-TRAP.

SPECIFICATION forming part of Letters Patent No. 419,003, dated January 7, 1890.

Application filed July 5, 1889. Serial No. 316,613. (No model.)

*To all whom it may concern:*

Be it known that we, JOSEPH BRUNWASSER and FRANK BRUNWASSER, residents of Pittsburg, in the county of Allegheny and State of Pennsylvania, have invented a new and useful Improvement in Fly-Traps; and we do hereby declare the following to be a full, clear, and exact description thereof.

Our invention relates to fly-traps, its object being to provide a fly-trap which is not only sure and efficient in its purpose, but one which is also ornamental in design and may be placed in any apartment without detracting from the appearance thereof.

It has been generally customary to construct these fly-traps of wire-gauze or some such material; but the appearance of such traps is objectionable, while at the same time they are difficult to clean, for when water is applied to them they become rusty and soon wear out. We propose, therefore, to form our improved trap of glass, so that it will be neat in appearance, durable, and may be readily cleansed and kept in order, while it will retain water or other liquid, and may contain an atmosphere such as will cause the suffocation or death of the flies.

To these ends our invention consists, generally stated, in a fly-trap formed of glass, having the base thereof upwardly inclined from the side walls in the form of a truncated cone, a central opening in said base, thereby forming an annular trough therein, and having an opening at one side of the body for the introduction of liquid into said trough.

To enable others skilled in the art to make and use our invention, we will describe the same more fully, referring to the accompanying drawings, in which—

Figure 1:
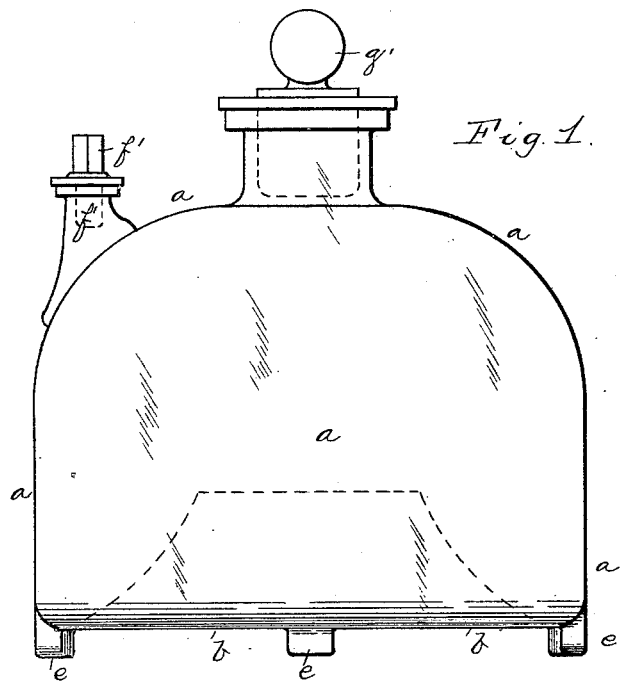
Figure 2:
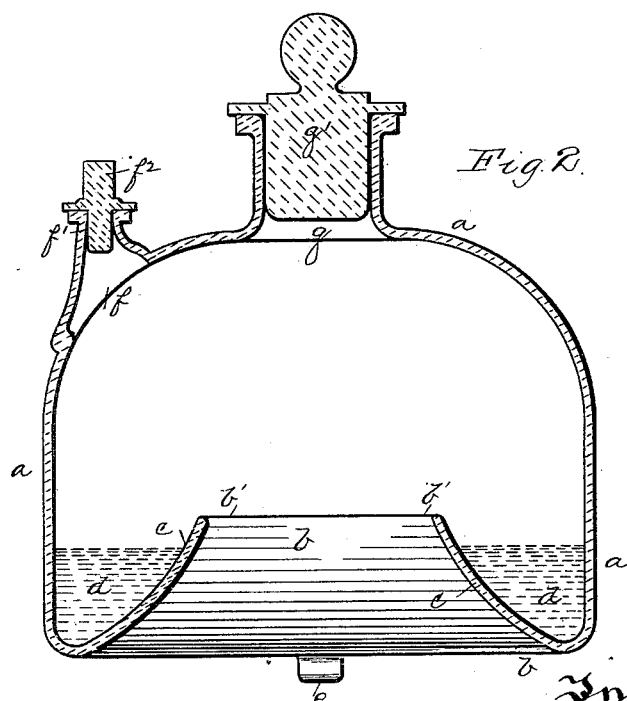

Figure 1 is a side view of our improved fly-trap, and Fig. 2 is a vertical cross-section of the same.

Like letters of reference indicate like parts in each.

As stated, our improved fly-trap is formed of glass, the body *a* being blown to the shape and size desired in the ordinary manner. The base *b* is formed upwardly inclined from the bottom of the side wall *c*, and has the central opening *b'* therein, so giving said base the form of a truncated cone. By this manner of construction an annular trough *d* is formed within the body *a*, having a depth equivalent to the height to which the inclined base *b* is carried. The whole body *a* is supported by suitable feet or lugs *e*, which are arranged at suitable intervals beneath said body, said feet or lugs being formed large enough to elevate the body *a* about an inch above the surface on which the said feet or lugs may rest. These feet or lugs *e* are also preferably formed of glass.

In order to introduce liquids or any other substance desired into the annular trough *d* from without the trap, an opening *f* is formed in the body *a* at a point on its surface where, when liquids or any other substances are introduced into said opening, they will be sure to fall into the said annular trough *d*. A suitable neck or spout *f'* is formed around said opening *f*, and is supplied with a stopper $f^2$, of glass or other suitable material. The body *a* is further supplied at the top with the central opening *g*, supplied with a stopper *g'*, and through this opening the liquid or other substance may be poured when it is desired to empty the trough *d*, or it may be employed when it is desired to wash or rinse out the interior of the trap.

When our improved fly-trap is in use, some suitable liquid—such as vinegar and water—or any poison in liquid form destructive to flies is first introduced into the opening *f*, whence it falls into the trough *d*, which is thus filled to the desired degree. The trap may be then placed in some convenient place, as on a table, with the feet *e* resting on the surface thereof. Sugar or some other edible substance may be placed on the table which supports the trap, and under said trap, in order to attract the flies. The flies will pass under the trap, through the space between the surface of the support on which the trap rests and the body of said trap elevated by the feet *e*, and up through the opening *b'* in the base *b*. When once within the trap, owing to the inclined base, it is difficult for them to find a way of escape before they have been overcome by the fumes arising from the vinegar or have tasted of the liquid poison in the trough *d* and fall into said trough.

The special advantage of our improved trap lies in supplying the body *a* with the side opening *f*, so that the liquids may be introduced directly into the trough *d* without the necessity of canting the body, which would be necessary if only a single opening, as at *g*, were formed in the center of the trap, and which operation is liable to be attended with the dropping of the liquid through the opening *b'* of the base *b* onto the surface of the support upon which the trap rests.

What we claim as our invention, and desire to secure by Letters Patent, is—

A fly-trap formed of a glass body having a top upwardly inclined toward the center, a base upwardly inclined from the bottom of the side walls, and a central opening in said base, so forming an annular trough, and having an opening at one side of said body leading directly into said trough, substantially as and for the purposes set forth.

In testimony whereof we, the said JOSEPH BRUNWASSER and FRANK BRUNWASSER, have hereunto set our hands.

JOSEPH BRUNWASSER.
FRANK BRUNWASSER.

Witnesses:
J. N. COOKE,
ROBT. D. TOTTEN.